(12) United States Patent
Klassen et al.

(10) Patent No.: US 7,519,381 B2
(45) Date of Patent: *Apr. 14, 2009

(54) TEXT MESSAGING CONVERSATION USER INTERFACE FUNCTIONALITY

(75) Inventors: Gerhard Dietrich Klassen, Waterloo (CA); Lawrence Edward Kuhl, Waterloo (CA); Shaul S. Wisebourt, Waterloo (CA)

(73) Assignee: Research In Motion Limited, Waterloo (CA)

( * ) Notice: Subject to any disclaimer, the term of this patent is extended or adjusted under 35 U.S.C. 154(b) by 51 days.

This patent is subject to a terminal disclaimer.

(21) Appl. No.: 11/695,916

(22) Filed: Apr. 3, 2007

(65) Prior Publication Data

US 2007/0173267 A1    Jul. 26, 2007

Related U.S. Application Data

(63) Continuation of application No. 11/008,921, filed on Dec. 13, 2004, now Pat. No. 7,218,943.

(51) Int. Cl.
*H04Q 7/20* (2006.01)

(52) U.S. Cl. .................. 455/466; 455/566; 455/418; 455/414.1; 455/412.1; 715/578; 709/206

(58) Field of Classification Search ............ 455/412.1, 455/414.1, 445, 566, 466, 418; 709/204–206, 709/250; 715/758–759, 752, 756, 764–765; 719/328, 329
See application file for complete search history.

(56) References Cited

U.S. PATENT DOCUMENTS

| | | | |
|---|---|---|---|
| 6,915,138 B2 * | 7/2005 | Kraft | 455/466 |
| 7,120,455 B1 * | 10/2006 | Chen et al. | 455/466 |
| 7,218,943 B2 * | 5/2007 | Klassen et al. | 455/466 |
| 7,251,495 B2 * | 7/2007 | Keyani et al. | 455/466 |
| 7,315,613 B2 * | 1/2008 | Kleindienst et al. | 379/88.13 |
| 7,328,242 B1 * | 2/2008 | McCarthy et al. | 709/204 |
| 2002/0073156 A1 * | 6/2002 | Newman | 709/206 |
| 2002/0152203 A1 * | 10/2002 | Ostergaard et al. | 707/3 |
| 2002/0152220 A1 * | 10/2002 | Kang et al. | 707/101 |
| 2003/0034878 A1 * | 2/2003 | Hull et al. | 340/5.61 |
| 2003/0078956 A1 * | 4/2003 | Ravichandran et al. | 709/107 |
| 2003/0114174 A1 * | 6/2003 | Walsh et al. | 455/466 |
| 2003/0163537 A1 * | 8/2003 | Rohall et al. | 709/206 |
| 2004/0015547 A1 * | 1/2004 | Griffin et al. | 709/204 |
| 2004/0015553 A1 * | 1/2004 | Griffin et al. | 709/206 |
| 2004/0083432 A1 * | 4/2004 | Kawamura et al. | 715/526 |
| 2004/0107159 A1 * | 6/2004 | Heil | 705/37 |
| 2004/0137884 A1 * | 7/2004 | Engstrom et al. | 455/414.1 |
| 2004/0215845 A1 * | 10/2004 | Davani et al. | 710/22 |
| 2004/0228531 A1 * | 11/2004 | Fernandez et al. | 382/187 |
| 2005/0143104 A1 * | 6/2005 | Kim | 455/466 |
| 2005/0149620 A1 * | 7/2005 | Kirkland et al. | 709/207 |
| 2005/0180392 A1 * | 8/2005 | Watkins | 370/352 |
| 2006/0031329 A1 * | 2/2006 | Robertson | 709/206 |
| 2006/0031361 A1 * | 2/2006 | Bailey et al. | 709/206 |
| 2006/0059160 A1 * | 3/2006 | Smola et al. | 707/10 |
| 2006/0075040 A1 * | 4/2006 | Chmaytelli | 709/206 |
| 2007/0050488 A1 * | 3/2007 | Joyner et al. | 709/223 |

* cited by examiner

*Primary Examiner*—Kamran Afshar

(57) ABSTRACT

A computer readable medium, method and user device for a user interface functionality for SMS and SMS-like message conversations is provided. A group of individual SMS messages is treated as a single entity by the SMS conversation UI, the SMS conversation history UI saves space by including the SMS editor within the conversation history panel, and displays a pop-up display with useful information regarding the SMS message being edited.

20 Claims, 4 Drawing Sheets

145

Sent less than one minute ago

Unknown

111 — Unknown: This is a test 112  113

FIG. 6

TEXT MESSAGING CONVERSATION USER INTERFACE FUNCTIONALITY

RELATED APPLICATION

This application is a continuation of application Ser. No. 11/008,921, which was filed on Dec. 13, 2004, now U.S. Pat. No. 7,218,943.

TECHNICAL FIELD

The technology relates to functionality of user interfaces and more particularly to user interface functionality for SMS (short message service) and SMS-like message conversations.

BACKGROUND

Short message service provides for individual text message communications. Two of the main aspects of user interfaces (UIs) for SMS are: (1) providing functionality for composition and viewing of an SMS message and (2) providing access to stored SMS messages.

Standard SMS applications treat individual messages in a stand alone manner in that they are each treated as though they were completely independent from one another. For example they are treated as though independent in substance, time of delivery, and addressee.

Functions that may be performed for each message, for example editing, saving, and sending of new messages, or viewing, replying to, saving, removing, re-sending and forwarding incoming messages, are provided on a single message, single addressee, single task basis, and known user interfaces (UI's) for processing SMS and SMS-like messages are designed in accordance with this.

Known user application interfaces for processing SMS messages apply a selected action to single selected SMS message.

BRIEF DESCRIPTION OF THE DRAWINGS

Embodiments will now be described with reference to the accompanying diagrams, in which:

FIG. 5 is an illustration of an example text messaging conversation history message hint pop-up;

FIG. 6 is an illustration of an example conversation history UI when the addressee is unknown, for example when a received SMS message was sent from an Internet server having access to an SMS gateway and there is no phone number to display;

DETAILED DESCRIPTION OF EMBODIMENTS

Figures 1, 2:
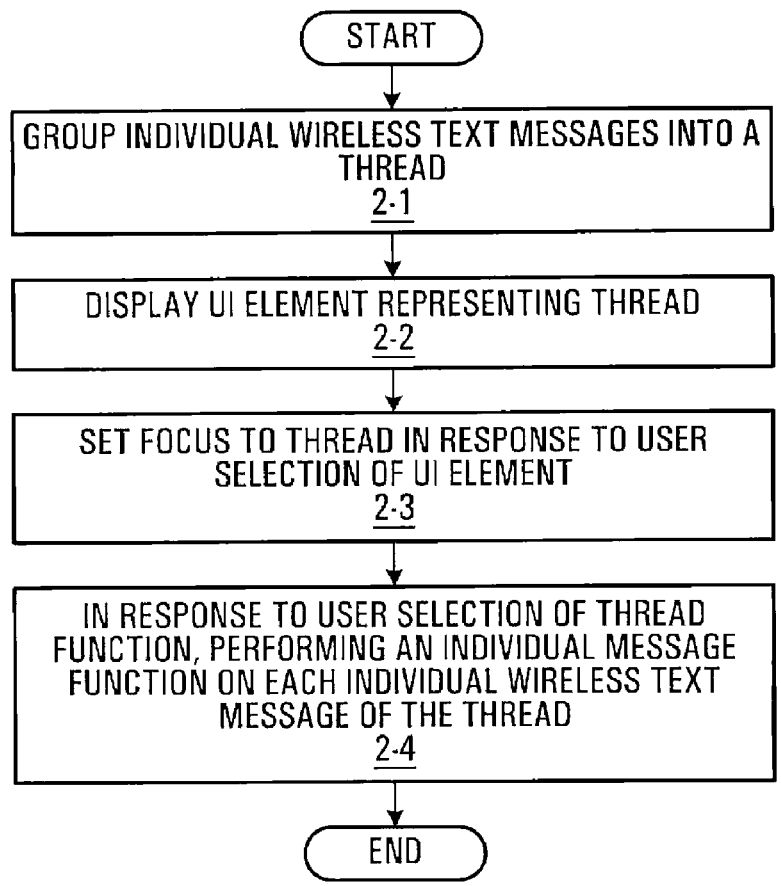
FIG. 1 is an illustration of an example message list application screen for a text messaging UI.
FIG. 2 is a flow diagram of an example of the procedure performed by a user device during thread processing.

According to a broad aspect of the application, there is provided a method for execution by a wireless user device to process SMS messages, the method comprising: grouping a plurality of individual SMS messages into threads, each thread containing one or more messages between a respective pair of two addresses; for each thread, displaying a respective UI (User Interface) display element representing the thread; receiving a selection of a UI display element representing a particular thread; and performing an individual function upon each of the individual SMS messages of the particular thread.

According to another broad aspect of the application, there is provided a computer readable medium having computer executable instructions stored thereon for execution on a processor so as to implement the method summarized above.

According to another broad aspect of the application, there is provided a wireless device comprising: a display screen; an input panel; and an SMS processing function operable to: group a plurality of individual SMS messages into threads, each thread containing one or more messages between a respective pair of two addresses; for each thread, display via the display screen a respective UI (User Interface) display element representing the thread; receive via the input panel a selection of a UI display element representing a particular thread; and perform an individual function upon each of the individual SMS messages of the particular thread.

According to another broad aspect of the application, there is provided a method in a wireless user device comprising: grouping a plurality of SMS text messages into a thread; displaying a UI (User Interface) display item representing the thread; accepting user input for selecting a function to be performed to each SMS text message of the thread, the function being selected from a plurality of available functions; in response to the user input, performing the function to each SMS text message of the thread.

According to another broad aspect of the application, there is provided a computer readable medium having computer executable instructions stored thereon for execution on a processor so as to implement the method summarized above.

According to another broad aspect of the application, there is provided a wireless device comprising: a display screen; an input panel; and an SMS processing function operable to: group a plurality of SMS text messages into a thread; display via the display screen a UI (User Interface) display element representing the thread; accept user input via the input panel for selecting a function to be performed to each SMS text message of the thread, the function being selected from a plurality of available functions; in response to the user input, perform the function to each SMS text message of the thread.

Other aspects and features of the present technology will become apparent to those of ordinary skill in the art upon review of the following description of specific embodiments in conjunction with the accompanying figures.

A text messaging UI is provided for providing various types of text messaging communication functionality on a wireless text messaging device. The text messaging UI is implemented in software, hardware or a combination of software and hardware. The UI interacts with a user through visual UI displays, and through user input devices such as keypads, pointing devices, touch sensitive screens or the like.

When referred to herein, a text messaging service is a service which provides for single text message interchange. One or more text messaging services are supported by the wireless text messaging device. These services might include one or more of SMS, e-mail, PIN messaging etc, text messaging such as quick messaging or instant messaging. The example that follows assumes multiple services are supported. However, there is also applicability to wireless text messaging devices that only support a single text messaging service.

Received communications or draft communications of different types reside within storage on the device. The message list application enables a user to review messages of different types, and apply different actions to each particular message. Stored messages of the different services (like e-mail, PIN, SMS and so on) provide the message list application with items to display. In the specific illustrated example, the message list application utilizes a new text messaging access UI of the text messaging conversation UT.

The text messaging UI has a message list application UT and a conversation history UT each of which are described in detail below, each of which generates displays according to the particular functionality being executed.

Messages are grouped into threads. In particular, in the context of a prolonged exchange of text messages of a given type between two parties, which for the purposes of the illustrated examples are referred to as the text messaging device user and the addressee, messages may be grouped into threads corresponding to conversations. In some implementations, threading is done for each text messaging service. However, in some embodiments, threading is only done for a subset of one or more text messaging services. In a particular embodiment, threading is only done for SMS messages.

Referring to FIG. 1, an example message list application UI will now be discussed in which each thread is represented by a single message.

The message list application UI example of FIG. 1 shows a message list 10 containing e-mail messages 11 each representing respective e-mail message threads, a PIN message 13 representing a PIN message thread, and text messages 12A, 12B representing text message threads.

Although in the particular example illustrated in FIG. 1 the message list 10 is unconnected to any particular task of an application, similar more specific message lists may be displayed in association with a specific task such as searching or saving.

A thread may have one or more messages. For example, in the illustrated example the thread containing the text message 12B from Jane Daniels contains no other text message, the single message being the first message in a new thread.

Grouping of messages into threads may be performed in many different ways, one example of which is implementation of the use of time stamps. A new thread is created by default when a message is sent/received to a user for which no thread has yet been established. When a new message is sent/received to a user for which a thread has been established, the default is to include the new message in the established thread. A text messaging device user may also mark the beginning of a new thread in conjunction with a message to a user for which a thread already existed in which case a new thread to that user is started. This might be done within the editing application for example.

In some embodiments, during message processing, each message that undergoes a change in status by for example creation or modification, has an associated time stamp recording the time of said change in status. This time stamp of a message therefore may be used by a text messaging device to determine the time when that message last changed status, for example, when it was created or received. Once each message is time stamped, by defining each thread as those messages having time stamp values from and including a first specific time, and up to but not including a final time, the messages may be ordered chronologically within the thread, and all messages can be unambiguously categorized as within the thread or outside the thread. Effectively, the "final time" is incremented each time a new message is added to a given thread to include the timestamp of the new message.

The message list application UI allows an action to be applied to each message belonging to a selected thread, rather than to a single message. The most basic operation is an open operation that opens all of the messages of a selected thread. Various actions are contemplated, and specific examples are provided below. For example, saving/removing the whole conversation thread might be very useful for the user when the whole conversation, as a single entity, gives a clear common context for each particular text message which is a member of that thread. All of those particular messages can now be saved together and subsequently removed together.

Before an action is applied to the messages of a thread, the "focus" of the UI needs to be moved to that thread. Any appropriate mechanism(s) of selecting the focus may be provided. These might involve keyboard input and/or pointing device input and/or touch sensitive screen input to name a few examples.

To access any individual text message of a thread represented by a single text message, the thread is selected, and a thread open function invoked through the user interface. For example, to open the thread represented by text message entry 12A from John Smith, the user selects (moves the focus) to that message, and invokes the open thread function. A conversation history UI display is presented containing all text messages that have been exchanged over the "history" of the thread, subject to any display size restrictions. In some implementations, in the event the display is not large enough, all of the messages are opened, and scrollably displayed in the conversation history UI display.

The application of different actions to specific text messages is provided for in the conversation history UI (discussed in detail below). Accordingly, in an example embodiment, this functionality is not duplicated in the message list application. Individual text messages that belong to threads having more than one text message are not separately displayed in the message list application UI 10 other than a single representative of the thread.

Rules may be defined that determine which text message should be the representative of a thread having more than one text message.

In an example set of rules, the latest message of a message thread is shown in the message list application unless there is an inbound message that was not read by the user. For example, the text message 12A from John Smith which represents the message thread which has all messages of the conversation with John Smith, is the latest (in this case the last) message exchanged in that thread.

If there is an inbound message that was not read by the user, it becomes the message thread's representative. Furthermore, if there is a number of unread messages in the message thread, the most recent one is displayed. When the status of such a message changes, it is replaced with the latest message from the message thread, unless there is another inbound unread message. Each message thread is represented with a single message in the message list application.

In some implementations, one of the messages of the thread is the thread's representative. More generally, a display element is used to represent each thread in the message list application UI.

Other sets of rules may alternatively be configured within the message list application UI.

In some embodiments, the option is provided to a user to explicitly "save" a particular message. All messages are stored when they are generated/received. Saving a message involves making a copy of the message elsewhere than the default storage position. In some implementations, the save action is available within the message list application UI in which case all of the messages of the thread are saved.

When an entire thread is deleted from storage, particular messages that were saved will still be available. These messages are a type of orphaned item. Orphaned items such as saved SMS text messages were once part of message threads but have been removed from the threads and no longer belong to any threads. When such an orphaned item is selected from a message list, the orphaned item is displayed in a conversation history panel along with other saved orphaned items from/to the same addressee. For saved items that belong to threads, these items are treated like unsaved items that belong to threads.

Unlike a general message list in the message list application, message lists for saved messages may have entries which are separate individual messages, rather than entries representing threads. According to an example embodiment, once a user has decided to save a particular message, it is assumed that this is the message he or she will expect to see in the saved items view which has a message list, and will not expect to see the representative message for the message thread. The same logic applies to a search results message list, namely, it is assumed that a user will expect to see individual messages which meet the search criteria in a results message list, rather than a representative message of a thread.

Referring now to FIG. 2, an example process performed by a user device during thread processing will now be described.

At step 2-1, a thread is created by grouping individual wireless text messages. A number of possible methods may be used to group messages into a thread. This is done on an ongoing basis with messages being added or new threads being created as required.

At step 2-2, a UI element representing each thread is displayed. In an example embodiment, for each thread the UI element is a particular wireless text message that represents the thread.

At step 2-3, in response to a user selecting the UI element representing the thread, the focus of the interface is set to the thread. A number of different selection mechanisms may be used to allow the user to select the thread. In an example embodiment, selection of the thread is effected by allowing the user to move a cursor or selected field using keys or a touch screen.

At step 2-4, in response to the user's selecting of a thread function, an individual message function is performed on each individual wireless text message of the thread. In an example embodiment, a thread function could be for example "Open/View Thread", and the individual message function in response thereto is to display and list each wireless text message of the thread in the conversation history UI display. Opening the message thread in the message list application will also cause any unopened message that belongs to the message thread to become opened.

By grouping the messages into threads and having individual message functions launched by invocation of a thread function such that each of the wireless text messages are subjected to the same action, all of the messages together are treated as part of a single entity, the message thread.

Figure 3:
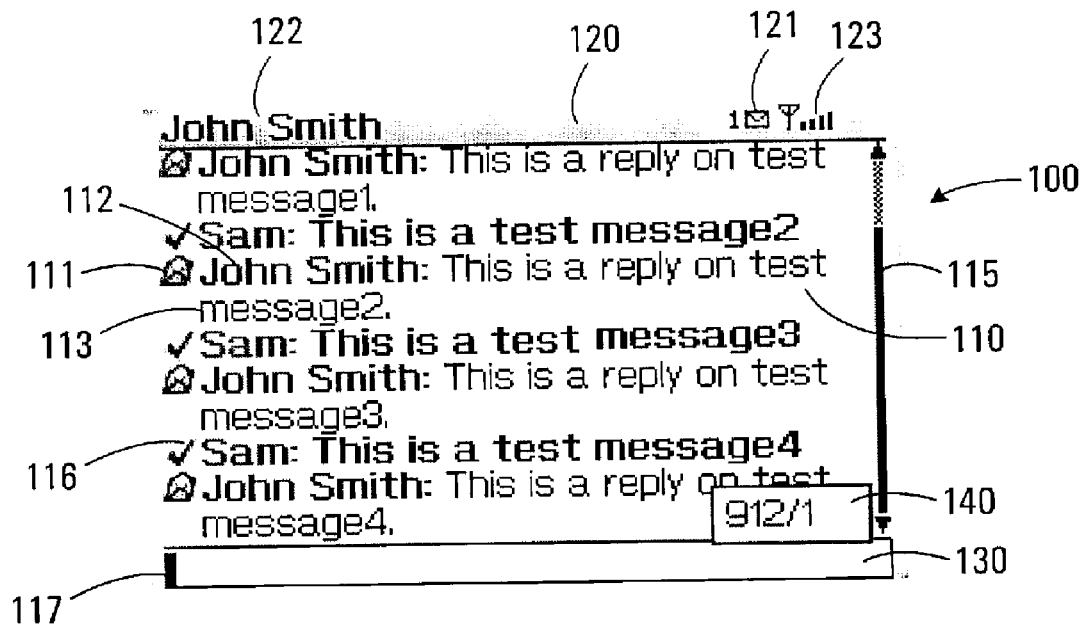
FIG. 3 is an illustration of a conversation history UI display.

Referring also to FIG. 3, an example conversation history UI display forming part of the text messaging UI will now be described.

One problem with known SMS messaging device user interfaces is that the user must exit the SMS message editor in order to apply actions to the particular SMS message after it has been edited/composed. According to the present embodiment, actions or functions can be applied to the focused or active text message in the conversation history list through menu items as well as with the use of shortcut keys, not requiring a transition to a different screen to select the action or function.

Unlike known SMS UIs, in some embodiments the display screen of the conversation history UI is an all-in-one text messaging utility that enables a user to save and edit drafts, and send new messages, and enables a user to view, reply to, save, remove, re-send and forward sent/received messages, all in the context of a conversation with a particular addressee.

The overall presentation of this new UI resulting from its enhanced functional design is an interactive conversational environment, so that text messaging communication becomes a conversation-like type of communication for text messaging device user.

The conversation history UI also includes screen layout features, and functional transition features for enhancing the text messaging conversation experience.

A combination of the message list application UI and the conversation history UI provide a completely new experience for the user that is a fast and convenient way to chat using text messaging.

In some embodiments, rules are applied for conversation history instantiation. A history panel displays messages sorted by the date they were initiated. The most recent messages are displayed closer to the bottom of the conversation history panel. More generally, in some implementations, more recent messages are displayed closer to the editor such that it is easier to review the most recent ones. Messages in the conversation history panel represent a range of messages beginning with the message that started the thread that is opened down to the most recent message associated with the thread which is received or sent.

In some embodiments, the text messaging conversation UI provides extensive colour usage and plain/bold text combinations that make messages in the text message conversation UI more readable.

Furthermore, in some embodiments, the text messaging conversation UI provides information on signal strength and unread messages in for example, a title bar. This is beneficial especially when a user spends a large amount of time using the editor.

Referring back to FIG. 3, the conversation history UI display is generally indicated by 100 and is logically divided into three parts: a title bar 120 (more generally a title area somewhere on the display), a conversation history panel 110, and an editor 130. Depending upon context, the editor 130 may function as a reply message editor or a draft message editor.

Also shown in FIG. 3 is a message counter pop-up 140 described in further detail below.

Based on the nature of SMS, SMS conversations are possible only between two users at a time, but there may be multiple such two-user SMS conversations ongoing simultaneously. Other text messaging services may allow multiple sender conversations, each for example between a text messaging device user and an addressee.

Figure 4:
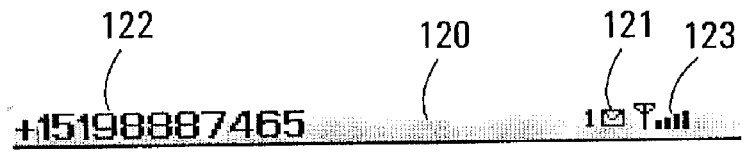
FIG. 4 is an illustration of an example title bar associated with a text messaging conversation thread with an addressee whose friendly name is not known.

The addressee's identification information 122 is displayed at the left side of the title bar 120. In some implementations, the user device displays a friendly name of the addressee (for example "John Smith" in FIG. 3) if available. For this purpose a text messaging device address book is searched for the phone number associated with this text message, and the name associated with that number if any is displayed. In case such an entry is not found, the addressee's full phone number is displayed as the identification information 122 as illustrated in FIG. 4. Other information may alternatively be displayed as the identification 122 in the title bar 120.

In a conversation environment (versus a single message viewer environment) a user may spend significant amounts of time within a conversation, without exiting the application. This is one reason it is useful to include functionality to keep a user updated regarding radio signal strength and the number of unread messages of any type and associated with any thread. The radio signal strength indicator 123 and a numeric indicator indicating the number of unread messages 121 are shown in the right hand portion of the title bar 120. Although this information is illustrated as being provided by specific icons in a specific part of the title bar, other icons and locations on the conversation history UI display could be used.

The conversation history panel 110 of the conversation history UI display 100 displays text messages from a single conversation thread, this consisting of a set of text messages between the text messaging device and a particular addressee. This set can include outgoing and incoming messages as well as saved drafts for this addressee.

Rules may be defined that apply to conversation history instantiation. In some implementations, the conversation history panel 110 displays messages sorted by the date and time of creation. In the illustrated example most recent messages are displayed closer to the bottom of the conversation history panel 110 while older messages are displayed closer to the top of the panel 110. The messages in the conversation history panel 110 by default are at most the messages in a range between the message responsible for starting the thread down to the most recent sent or received message sent belonging to the thread. In particular, the messages being displayed belong to the selected thread. In this implementation messages sent or received prior to the sending or receiving of the message responsible for opening the selected thread are not displayed. This allows a user to explicitly open a particular thread and view recent messages which are shown to remind the user of the messages that already have been written and the recent replies.

As discussed above, when a saved text message selected from the message list application is an orphaned item, only the saved text message and other saved messages that are orphaned items for the same addressee are included and displayed in a conversation history. For a saved message that belongs to a thread and is not orphaned, the saved message is treated as any text message belonging to a thread for purposes of history collecting, grouping, and displaying.

Any one or more of the messages in the conversation history can be selected by the user at which time the selected message(s) become(s) the subject of the focus of the UI display. Both in the case where a user has opened a particular message from a message list application and in the case where a user has explicitly set the focus on some message field, for example by scrolling a track wheel or pressing hotkeys (discussed in detail below), the display scrolls the conversation history to this particular message field.

The scrollbar 115 of FIG. 3 is a useful part of the conversation history UI display since a conversation history may be quite long and may not all fit on the display at once. In some implementations, the scrollbar is also used to provide the device user with the information regarding length of the conversation history by displaying the scrollbar with a length ("thumb size") that is inversely proportional to the number of messages and by positioning the scrollbar ("thumb position") to represent the current display location in history.

The scrollbar 115 need not be displayed if there is enough space to fit all of the conversation history on the conversation history panel 110 at one time.

As is mentioned above, the conversation history panel 110 displays a set of text messages. There may be multiple separate fields designated for each message. In the illustrated example, these fields consist of a status icon 111, an identity of the text messaging device user or addressee 112 of the message, and a message body 113.

The status icon 111 is a visual representation of a message's current status. Different icons are displayed for messages that are being composed, or have been sent successfully/not successfully, or have been received. The status icon is updated as changes occur in the associated message's status. Icon 116 is an example icon indicating a message has been successfully sent. In some implementations, there are embedded graphics such as "smileys" for example to make the user experience enjoyable.

A text messaging device user's name is taken from the device owner information. If it does not exist, a "Me" substitution or the like is used in the display to refer to the text messaging device user. The addressee's name is collected in a similar manner as that used to collect title bar 120 addressee information (discussed above). In an instance in which neither the friendly name nor the phone number are available, the identity shown in the display is the "Unknown" string. In the illustrated example both the text messaging device user's and addressee's names are displayed distinctively, for example in bold font, in some implementations in two different colours such as a red and blue colour respectively, to differentiate between the two participants in the conversation. In order to clearly distinguish between messages of a text messaging device user and an addressee, the text of the message body of messages initiated by the text messaging device user, is in some implementations displayed distinctively, for example in bold text. Alternatively, in another implementation the text of the message body of messages from the addressee is displayed in bold text.

The message body is the informative content of the text message. In some cases a message's content may be quite long, and up to several lines.

In some embodiments, pop-up displays are used to display message-related date information in a friendly format saving visual space within the display that can then be used for displaying the text body of more messages. The particular pop-up displays that are generated are context sensitive., More generally, such information can be displayed in display elements that may or may not appear in a pop-up manner.

In one example, a character counter is implemented as a pop-up display. This is indicated at 140 in FIG. 3 and is displayed while a user is actively editing using the editor 117. As indicated, in some embodiments, the text messages are SMS messages. An SMS message may be limited in the number of characters it may comprise. This character length of an SMS message is network and SMS standard specific. In some implementations, a message that is longer than the maximum size is automatically split into multiple messages. The counter pop-up displays the number of characters that are still available within a current message for typing and the number of single SMS messages (packets) that will be sent. In an example embodiment, this information is separated by a slash. For users it is convenient to know how many messages are being sent out because in some systems the user is going to pay for them on a per message basis.

In some implementations, embedded graphics (smileys) are enabled for both static and editable text components. In some embodiments, a copy/paste functionality for embedded graphics is also provided.

In some embodiments, pop-up displays are also used to present additional information regarding the status of a message and the time when the message was sent, saved as a draft or received. Such a pop-up display is presented for example when a user selects a particular message, or when a user points to a particular message but has not yet selected the message (the equivalent of "mousing over"). This information could also be displayed without the use of pop-up displays. An example of such additional information in the form of a pop-up display is depicted in FIG. 5. Rules may be defined to determine how the information is formatted. The information may for example include the status of the message ("Sent", "Saved", "Received", "Composed" for drafts) and may indicate how long since the status last changed. Depending on how much time has elapsed from the moment when the message's status last changed, different messages may be displayed for the user. For example, the following time information might be displayed:

a. Time elapsed is less that one minute—". . . less than one minute ago";

b. Time elapsed is equal to one minute—". . . one minute ago";

c. Time elapsed is more than one minute, but less than thirty minutes—". . . N minutes ago", where N is the number of minutes elapsed;

d. Time elapsed is more than thirty minutes, but less than twenty-four hours—the exact time when message's status changed;

e. Time elapsed is more than twenty-four hours—the exact time and date, month and year, when message's status changed.

For the example of FIG. 5, the message with which a pop-up display 145 is associated was "sent less than one minute" ago. Such time information provides information to a user on how much time has elapsed since a particular message has been sent or received without the user having to exit the conversation history panel 110.

Rules can be defined according to which counter pop-ups 140 will be displayed. The pop-up 140 can be set as visible or hidden.

In the illustrated example, the counter pop-up 140 is set visible whenever the focus is set on the reply editor 130, and when the user starts typing 117 in the reply editor 130.

In the illustrated example the counter pop-up becomes hidden, whenever the focus leaves the reply editor, whenever any screen overlaps the SMS compose/view UI, whenever the escape button is pressed to exit the SMS compose/view UI screen, and whenever the editor is idle for more than for example two seconds.

Referring also to FIG. 6, there is a special case that might be implemented in some embodiments to deal with the case of an incoming message having an unknown sender (for example, when the message was sent from a web site). In such a case, the SMS compose/view UI reply editor 130 is not displayed and conversation history is not collected. The user can view the title bar and the message itself only.

There are a number of different actions that can be applied to text messages depending on their status.

In some embodiments there is a "View calendar" menu item which is always available to the user regardless of focus location. Selection of this menu item launches a calendar application's main screen.

Conversation history UI menu items are menu items associated with the text conversation history UI display and particular with respect to messages in the conversation history panel. There are a number of menu items that may be provided for all conversation history messages that have been saved:

a. "View folder" allows a user to switch to a folder screen and review all the messages in a folder that the message focused on the history panel has been saved in.

b. "Call addressee", where "addressee" is a phone number or friendly representation of the second party in a conversation. This menu item allows the placement of a call to the addressee, using the phone number that was used for the text messaging conversation.

c. "SMS addressee" or "Send message to addressee", where "addressee" is a phone number or friendly representation of the second party in a conversation. This menu item allows the marking of a new message composed by a text messaging device user as the beginning of a new conversation thread.

In an example embodiment, general menu items "Next Item" and "Previous Item", provided by an outer context (for example the Message List application), have associated rules that are applied in the conversation history UI. In some implementations, no matter how the focus is moved between the messages in the conversation history UI display, the item selected in the message list application, and hence the focus within the message list application, will remain unchanged. If the focus in the message list application happens to be on a message representing a thread, that focus, since it merely represents a focus on the thread, also does not change when the focus in the conversation history UI display moves between messages. The conversation history UI does not change the "anchor" in the message list as such behavior might be unexpected by the user.

In some embodiments, an outgoing message, regardless of whether it has been sent successfully or not, can be saved, forwarded, re-sent, or deleted.

In some embodiments each inbound message is marked opened/unopened (depending on current status), saved (in case it was not saved before), forwarded, or deleted.

In some embodiments the "Forward" menu item is considered the default menu item.

In some embodiments, the "Edit draft" menu item is used as the default menu item.

In some embodiments, a text message that is currently being composed in the text messaging reply editor can be either sent or saved as a draft. In some implementations, the reply editor has a number of menu selections associated therewith.

In some embodiments, invocation of the "Send" menu item causes the storage of the message in storage on the text messaging device, physically performs sending of the message and adds the new sent message to the conversation history panel.

In some embodiments invocation of "Save as a draft" menu item causes storage of the message with storage on the text messaging device and adds the saved draft message to the conversation history panel.

In some example embodiments the "Send" menu item is the default menu item.

In some implementations, the conversation history UI supports a number of shortcut keys. Most of the shortcuts are available only when the focus is set on one of the history message fields. In some example embodiments the one exception is that pressing the ENTER key will cause invocation of the default menu item regardless of the focus location. The default menu item, as described above, is defined based on the particulars of the item currently under focus.

In some embodiments pressing a defined key causes the history to scroll to the top of the conversation history panel and set the focus on the oldest message in the conversation history panel.

In some embodiments pressing a defined key causes the history to scroll to the bottom of the conversation history panel and set the focus on the most recent message in the conversation history panel.

In some embodiments, messages can be forwarded without leaving the conversation UI. When the focus is on a particular message, pressing a defined key will result in messaging forwarding operations being instigated. This can include opening a window to select a forwarding address or addresses.

In some implementations, a history for the selected addressee will be displayed in the history panel, and the contents of the original message will be copied to the reply editor ready to be sent (forwarded).

In some embodiments pressing a defined key will scroll the history one page up or one page down.

In some embodiments pressing a defined key will set the focus on the reply editor for further text input.

In some embodiments pressing a defined key will toggle the display between the friendly name of the addressee (if available) and addressee's phone number in the title field.

In some embodiments pressing a defined key will remove the message from both a history list to display and the message thread containing the message. If the message was previously and explicitly saved, the message will still remain among the saved items in SMS storage.

Where defined keys are referred to in the above examples, more generally any defined UI activity can be employed to instigate a particular action.

In some embodiments, the message list UI may define shortcut keys that will be recognized by the conversation history UI for SMS as well as many other application viewers that can be started from message list.

A text messaging device user may compose a reply to an incoming message from an addressee, from within the same conversation screen from which the text messaging device user opened and viewed the incoming message. In order to perform this reply function, while the focus remains on the conversation history panel, the user may invoke the reply editing function. This may be invoked in an application specific manner. For example, this can involve scrolling to the bottom of the screen until the cursor 117 enters the reply editor 130, or the user may simply press an appropriate hot-key. If the text messaging device's focus has already been set to the editor, the user can start typing a reply message right away.

A default height of the reply editor 130 may for example be set equal to the height of one line of text. Other defaults can be used. In some implementations, in an instance in which a message requires additional lines, the reply editor 130 adjusts itself to display more lines at a time. The maximum number of lines that may be displayed concurrently on the screen is dependent upon the size of the font used. In some implementations, the reply editor 130 should not occupy more than 30% of the total screen height. In the instance where the maximum height is reached, the reply editor 130 scrolls lines automatically. Once a message is sent (or saved as a draft), the reply editor 130 is cleared and it takes on its original dimensions (one line in height).

In the case that there is some text typed by a user in the message editor 130 and an escape or cancel function is invoked by the user, for example in the illustrated example when an ESCAPE button is pressed, the user will be prompted for confirmation to abort composition. If the user wishes to save the text, the text in the reply editor should be saved explicitly as a draft (unsent outgoing message instead of "mail") by invocation of the save function.

Figure 7:
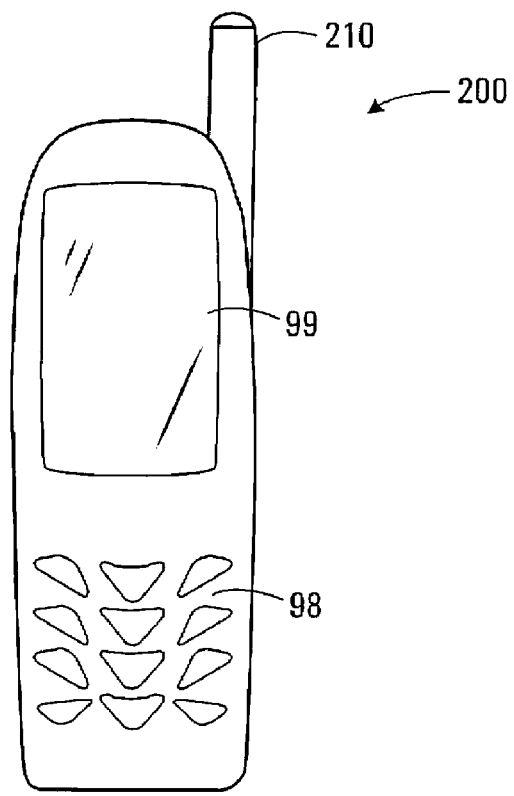
FIG. 7 is an exterior view of an example wireless text messaging user device.
Figure 8:
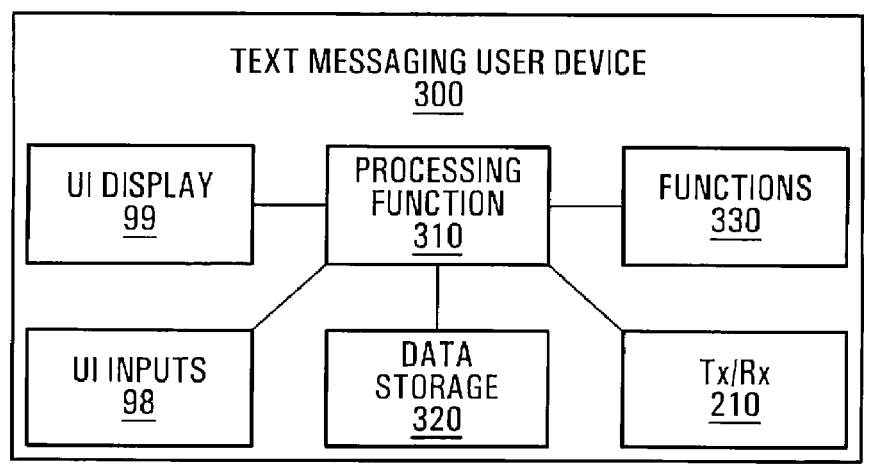
FIG. 8 is a functional block diagram of an example wireless text messaging user device.

Referring to FIGS. 7 and 8, an example wireless text messaging user device 200 will now be described. With respect to the use of a text messaging UI, the exterior of the text messaging user device 200 has a display screen 99 which may be an LCD screen, touch screen, or any other suitable visual display, an input panel 98 which may be a keypad or any other suitable input. The text messaging UI displays information to the user on the display screen 99, while the user provides information and makes selections using the input panel 98. In FIGS. 7 and 8, although the input panel 98 and the display screen 99 are shown as separate items, it is to be clearly understood that in some embodiments the display screen can be used for receiving user inputs and therefore also forms at least part of the input panel 98.

A transmitter/receiver 210 in the form of an antenna and associated electronics, is provided to enable the text messaging device to transmit and receive text messages.

Referring now to FIG. 8, the text messaging user device 300 has a processing function 310 which is coupled to the UI display 99 and UI inputs 98 for interaction between the user and the device. The processing function 310 also is coupled to a data storage 320 which is for storage and retrieval of messages. A transmitter/receiver 210 is also coupled to processing function 310 to enable the device to transmit and receive various text messages. Text messaging UI 330 comprises software stored on an appropriate computer readable medium or memory executable by the processing function 310 and/or hardware for implementing the text messaging UI.

While a particular layout has been presented in FIG. 8, it should be noted that processing function 310, text messaging UI 330, and data storage 320 may be physically implemented in a number of different ways, for example any number of these may be integrated together or remain physically separate elements, and each of these may be implemented in hardware, software, firmware, or any combination thereof.

Numerous modifications and variations of the present technology are possible in light of the above teachings. It is therefore to be understood that within the scope of the appended claims, the technology may be practiced otherwise than as specifically described herein.

We claim:

1. A method for execution by a wireless user device to process SMS messages, the method comprising:
   automatically grouping a plurality of individual SMS (Short Message Service) messages into threads, each thread containing one or more messages between a respective pair of two addresses comprising an address of the wireless user device and another address, wherein each SMS message is grouped into one of the threads based on the another address of the SMS message;
   for each thread, displaying a respective UI (User Interface) display element representing the thread;
   receiving a selection of a UI display element representing a particular thread; and
   performing an individual function upon each of the individual SMS messages of the particular thread;
   wherein individual functions available comprise a thread open function, and performing the individual function respectively upon each of the individual SMS messages comprises displaying in a conversation history display listing each of the individual SMS messages of the thread.

2. The method of claim 1 wherein each thread has a start time and an end time, and each SMS message between the respective pair of addresses that has a time stamp between the start time and the end time is assigned to that thread.

3. The method of claim 1 further comprising:
receiving a user selection of the individual function to be performed.

4. The method of claim 1 further comprising:
saving individual SMS messages in response to user input;
grouping saved individual SMS messages that no longer belong to a thread; and
in response to a user input, displaying the saved individual SMS messages to/from a selected address in a display list.

5. The method of claim 3 wherein the individual functions available further comprise at least one of:
a thread delete function, and performing the individual function respectively upon each of the individual SMS messages comprises deleting each individual SMS message of the thread; and
a thread save function, and performing the individual function respectively upon each of the individual SMS messages comprises saving each individual SMS message of the thread.

6. The method of claim 5 wherein the conversation history display comprises an indication of a current radio signal strength and an indication of a number of unread SMS messages.

7. The method of claim 5 wherein the conversation history display comprises a status for each text SMS message displayed.

8. The method of claim 5 further comprising:
in response to a user input, displaying a display element in association with a particular text SMS message in the conversation history display, the display element providing an indication of an elapsed time since a status of the particular text SMS message last changed.

9. The method of claim 5 further comprising:
displaying a message editor as part of the conversation history display.

10. The method of claim 9 further comprising:
displaying a display element indicating a number of allowed characters remaining for a SMS message being edited.

11. The method of claim 9 further comprising:
automatically splitting a SMS message being composed into multiple SMS messages if the SMS message being composed is to long for a single SMS message;
while the SMS message is being composed, displaying a number of single SMS messages that will be sent.

12. The method of claim 1 wherein the grouping, displaying are performed for messages for multiple different text messaging services to produce threads that are message threads of multiple different text messaging services.

13. The method of claim 1 wherein for each thread the respective UI element is a particular wireless text message that represents the thread.

14. A computer readable medium having computer executable instructions stored thereon for execution on a processor so as to implement the method of claim 1.

15. A wireless device comprising:
a display screen;
an input panel; and
an SMS (Short Message Service) processing function operable to:
automatically group a plurality of individual SMS messages into threads, each thread containing one or more messages between a respective pair of two addresses comprising an address of the wireless device and another address, wherein each SMS message is grouped into one of the threads based on the another address of the SMS message;
for each thread, display via the display screen a respective UI (User Interface) display element representing the thread;
receive via the input panel a selection of a UI display element representing a particular thread; and
perform an individual function upon each of the individual SMS messages of the particular thread;
wherein individual functions available comprise a thread open function, and performing the individual function respectively upon each of the individual SMS messages comprises displaying in a conversation history display listing each of the individual SMS messages of the thread.

16. A method in a wireless user device comprising:
automatically grouping a plurality of SMS (Short Message Service) text messages between a pair of two addresses comprising an address of the wireless user device and another address into a thread wherein each SMS message is grouped into the thread based on the another address of the SMS message;
displaying a UI (User Interface) display item representing the thread;
accepting user input for selecting a function to be performed to each SMS text message of the thread, the function being selected from a plurality of available functions;
in response to the user input, performing the function to each SMS text message of the thread;
wherein the plurality of available functions comprises a thread open function, and performing the function to each SMS text messages of the thread comprises displaying in a display list each of the SMS text messages of the thread.

17. The method of claim 16 wherein the plurality of available functions further comprises at least one of:
a delete function for deleting each SMS text message of the thread; and
a save function for saving each SMS text message of the thread.

18. The method of claim 16 wherein grouping comprises:
starting a new thread upon receipt of an SMS message from an address for which no thread has been started or upon transmission of an SMS message to an address for which no thread has been started;
adding each subsequent sent or received SMS message to an appropriate thread for the SMS message.

19. A computer readable medium having computer executable instructions stored thereon for execution on a processor so as to implement the method of claim 16, 20. A wireless device comprising:
a display screen;
an input panel; and
an SMS (Short Message Service) processing function operable to:
automatically group a plurality of SMS text messages between a pair of addresses comprising an address of the wireless device and another address into a thread, wherein each SMS message is grouped into the thread based on the another address of the SMS message;
display via the display screen a UI (User Interface) display element representing the thread;

accept user input via the input panel for selecting a function to be performed to each SMS text message of the thread, the function being selected from a plurality of available functions;

in response to the user input, perform the function to each SMS text message of the thread;

wherein the plurality of available functions comprises a thread open function, and performing the function to each SMS text messages of the thread comprises displaying in a display list each of the SMS text messages of the thread.

* * * * *

UNITED STATES PATENT AND TRADEMARK OFFICE
CERTIFICATE OF CORRECTION

PATENT NO. : 7,519,381 B2
APPLICATION NO. : 11/695916
DATED : April 14, 2009
INVENTOR(S) : Gerhard D. Klassen et al.

It is certified that error appears in the above-identified patent and that said Letters Patent is hereby corrected as shown below:

Column 3, line 9, "...conversation UT." should be --...conversation UI.--;
Column 3, line 10, "...list application UT..." should be --...list application UI...--; and
Column 3, line 11, "...history UT..." should be --...history UI...--.

Signed and Sealed this

Seventh Day of July, 2009

JOHN DOLL
*Acting Director of the United States Patent and Trademark Office*